Dec. 22, 1953    A. W. WAGNER    2,663,396
CENTRIFUGALLY ENGAGED CLUTCH
Filed May 28, 1948    2 Sheets-Sheet 1

INVENTOR.
ARTHUR W. WAGNER
BY
Christian A. Nielsen
ATTORNEY.

Dec. 22, 1953   A. W. WAGNER   2,663,396
CENTRIFUGALLY ENGAGED CLUTCH
Filed May 28, 1948   2 Sheets-Sheet 2
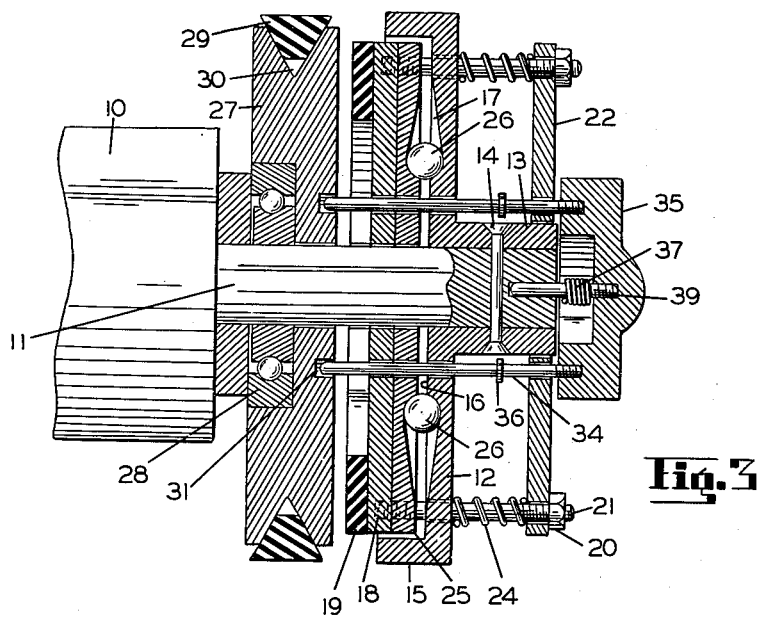
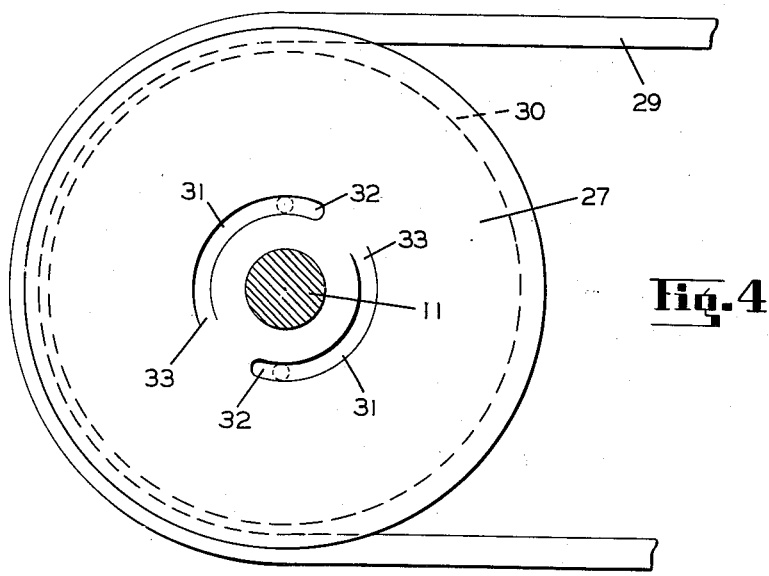
INVENTOR.
ARTHUR W. WAGNER
BY
Christian R. Nielsen
ATTORNEY.

Patented Dec. 22, 1953

2,663,396

UNITED STATES PATENT OFFICE 2,663,396

CENTRIFUGALLY ENGAGED CLUTCH

Arthur W. Wagner, Milwaukee, Wis., assignor to Easy Power, Incorporated, Milwaukee, Wis., a corporation of Wisconsin Application May 28, 1948, Serial No. 29,709

3 Claims. (Cl. 192—105)

My invention relates to clutches and more particularly to a self-adjusting type of friction clutch.

The object of my invention is to provide a device to act as a means for frictionally driving one device by another device acting as an actuating means.

Another object of my invention is to gradually provide frictional engagement in the form of a clutch type drive unit with the driven unit.

Still another object of my invention is to provide a device whereby the frictional engagement of the clutch is governed by the speed of the driving unit.

A further object is to provide a device in which two or more driven units may be driven at various time cycles by the same driving unit.

A still further object of my invention is to provide a device that is adaptable for many types of installations and may be used for various purposes.

The device is easily applied and assembled and may be manufactured at a nominal cost.

It is manifest to anyone familiar with the use of clutches in driving mechanisms, that it is often necessary to provide a clutch that will engage gradually, one that will permit the driven unit to be put into operation when the proper speed of the driving unit has been attained. The device specified, claimed and illustrated herein incorporates these desirable features, is simple in construction and easy to apply to various units, it being mounted to the shaft of the driving unit.

Other and further objects of my invention will become more apparent as the description proceeds and when taken in conjunction with the drawings in which Figure 1 is a fragmentary cross-sectional view of the assembled device provided with a single driving disc shown out of engagement with the driven pulley and showing the starting arrangement out of engagement.

Figure 3 is a fragmentary cross-sectional view of the device as shown in Figures 1 and 2 with the driving disc out of engagement with the driven pulley, but showing the starting arrangement in engagement with the driven pulley.

Figure 4 is a side view of the driven pulley showing the radially disposed starting grooves, and showing a fragmentary view of the V belt contacting a portion of the peripheral groove of the pulley.

Figure 1:
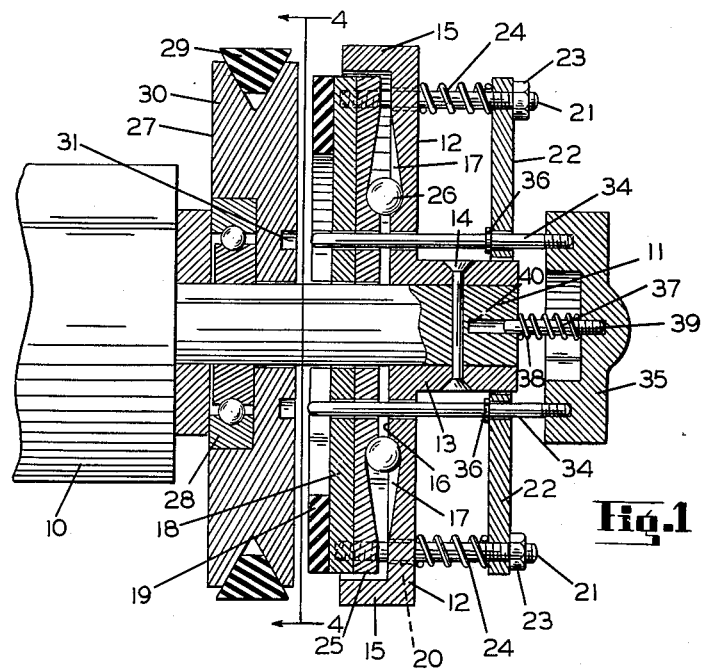

Similar characters of reference indicate corresponding parts throughout the several views and referring now to the same Figure 1, the character 10 shows a driving or actuating unit such as an internal combustion engine having a drive shaft 11. There is a drive disc 12 having a hub member 13 shown attached to the shaft 11 by means of a pin 14, but obviously a key or any other attaching means may be employed for the purpose. The outer periphery of the drive disc 12 is provided with a flange 15 extending at right angle to the face 16 of the disc 12. This face 16 is provided with indentations 17 tapered to the contour of a tear drop design, extending outwardly from a deep semi-spherical contour to the face 16 of the disc 12. There is an auxiliary disc 18 fixed to rotate with, but axially movable on the shaft 11. The disc 18 is provided with a clutch face 19 made of an impregnated fabric or the like, which may be adherently attached to the face of the disc 18 or riveted thereto. The disc 12 is provided with a plurality of apertures 20 to accommodate outwardly extending pins 21 threadedly engaging the auxiliary disc 18 at one end and retained in engagement with a plate 22 near their other end, by means of a threaded member or nut 23, against the tension of the resilient member 24 engaging the pins 21. These resilient members 24 are disposed between the plate 22 and the disc 12. The plate 22 engages the periphery of the hub 13 on the disc 12.

The inner face of the auxiliary disc 18 opposite the face supporting the impregnated fabric 19 is recessed to receive studs 21 which connect the disk 18 to a ring member 25 which is tapered at the same angle as the indentation 17 but in opposite relation thereto, to accomodate a corresponding number of spherical members or balls 26 which normally are disposed in the deepest part of the indentations 17 and are caused to move outward toward the periphery of the discs 12 and 18 as the discs are revolved, and as the balls 26 move outward they will cause the discs 12 and 18 to spread apart, creating contact of the face 19 with the outer face of the driven pulley shown as 27 which is rotatably mounted to the shaft 11 by means of the ball bearing assembly 28. There is a V-type belt 29 engaging the V-groove 30 extending around the periphery of the drive pulley 27.

From the description it is manifest that the shaft 11 must rotate at a pre-determined number of revolutions per minute before the pulley 27 is driven, due to the contact of the face 19 on the auxiliary disc 18. This contact is made due to the spreading of the discs 18 and 12 caused by the balls 26 forcing their way within the tapered indentations 17 and against the ring 25.

Figure 2:
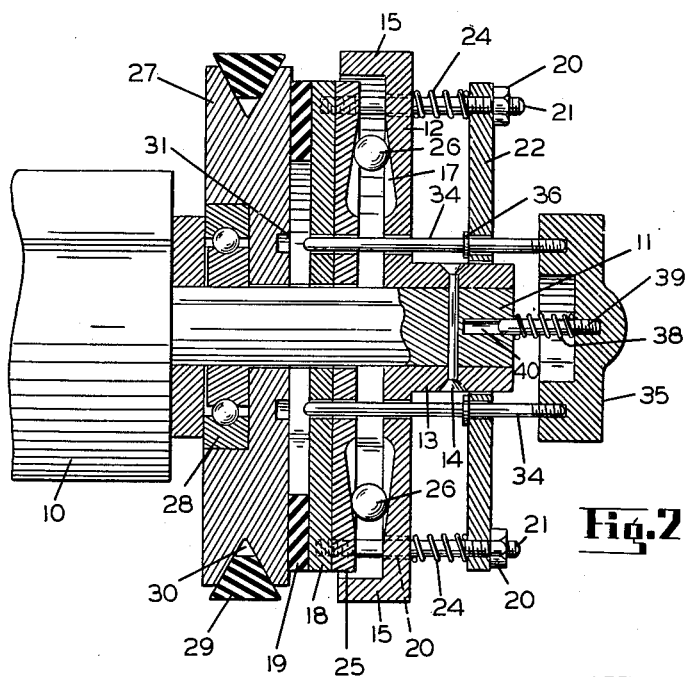
Figure 2 is a fragmentary cross-sectional view of the device as shown in Figure 1 with the driving disc in engagement with the driven pulley, and with the starting arrangement out of engagement.

The face of the pulley 27 is shown provided with a pair of arcuate grooves 31 which are deeper at the one point 32 and tapered upward in depths to a point 33 even into the face of the pulley 27. The arcuate grooves 31 are employed for the engagement of the pins 34 extending through the discs 18, 12 and 22. The outwardly extending ends of the pins 34 threadedly engage an engaging disc 35 and have outwardly extending flanges 36 which contact the inner face of the plate 22 due to the tension of a resilient member 37 encircling a rod 38 threadedly supported at 39 by the disc 35, and slidably engaging an aperture 40 in the end of the shaft 11. When the driven pulley 27 is manually revolved by means of the belt 29 it acts as a driving force to start the actuating means. When the disc 35 is forced inward against the pressure of the resilient member 37, it permits the ends of the pins 34 to engage the circular grooves 31 at their deepest part 32 as shown in Fig. 3, and when the rotating speed of the shaft 11 increases it will disengage the ends of the pins 34 from the grooves 31 due to the tapered depth of the circular groove 31, and the pins will move from their deep point 32 to the shallow point 33 as shown in Fig. 3, thereby permitting release of the pins 34, and the free revolution of the shaft 11, and as this revolving speed increases, it will again spread the discs 12 and 18 by means of the balls 26 frictionally engaging the clutch surface 19 with the face of the pulley 27 as shown in Figure 2.

In the chosen embodiments of my invention there are present many features not heretofore disclosed in the prior art and although I have described specifically the component parts constituting the device I am fully cognizant of the fact that many changes may be made in the form and configuration of the parts without affecting their operativeness, the spirit of my invention or the scope of the appended claims.

Having thus described my invention what I claim and desire to secure by Letters Patent in the United States is:

1. A clutch mechanism of the character described comprising, a driven shaft, a main disc rigidly mounted to said shaft, an auxiliary disc provided with a frictional contact member on its outer face, a driven pulley mounted on said shaft adjacent to said auxiliary disc, said main disc and auxiliary disc resiliently urged toward one another, said main disc provided with a plurality of semi-radial indentations tapered outward from their greater depth toward the periphery of said main disc, said auxiliary disc provided with a tapered annular ring in opposite relation to said indentations in the main disc, and a plurality of spherical members disposed for engagement with said indentations and held therein by means of said tapered ring, said spherical members moving outward toward the periphery of said discs when said discs are revolved, causing said auxiliary disc to move away from said main disc causing frictional contact of said auxiliary disc with said driven pulley.

2. A clutch mechanism of the character described comprising in combination, a driven shaft, an annular disc rigidly mounted to said shaft, an auxiliary disc slidably mounted to said shaft, resilient means for urging said discs towards one another one of said discs having in its face a plurality of semi-radial indentations tapering from their deep part outward toward the periphery of said disc, the other disc provided with an annular tapered ring arranged in alignment with said indentations but in opposite angular relation thereto, a plurality of spherical balls corresponding in number to said indentations, said balls disposed within said indentations, thereby contacting the inner face of said main disc and the annular ring in said auxiliary disc, a contact member attached to the outer face of said auxiliary disc, a driven member rotatably mounted to said shaft adjacent to and spaced from the contact member on said auxiliary disc, the spherical balls within said indentations spreading said auxiliary disc away from said main disc for the engagement of its contact surface with said drive member due to the outward travel of said balls within said indentations caused by the centrifugal movement of said main disc.

3. A clutch mechanism of the character described comprising in combination, a driven shaft, an annular disc rigidly mounted to said shaft, an auxiliary disc slidably mounted to said shaft, resilient means for urging said discs towards one another one of said discs having on its face a plurality of semi-radial indentations tapering from their deep part outward toward the periphery of said disc, the other disc provided with an annular tapered ring arranged in alignment with said indentations and in opposite angle thereto, a plurality of spherical balls corresponding in number to said indentations, said balls disposed within said indentations thereby contacting the inner face of said main disc and face of said annular ring, in said auxiliary disc, a contact member attached to the outer face of said auxiliary disc, a driven member rotatably mounted to said shaft adjacent to and spaced from the contact member on said auxiliary disc, said driven member equipped on its face with a pair of arcuate grooves tapered outward from a low point to the surface of said member, a corresponding number of pins supported by said discs, said pins arranged for manual engagement at one end with said radial slots in said driven member, and resilient means for urging said pins out of engagement with said slots.

ARTHUR W. WAGNER.

References Cited in the file of this patent.

UNITED STATES PATENTS

| Number | Name | Date |
| --- | --- | --- |
| 369,159 | Burns | Aug. 30, 1887 |
| 503,923 | Wolf | Aug. 22, 1893 |
| 796,205 | Graham et al. | Aug. 1, 1905 |
| 1,842,820 | Chryst | Jan. 26, 1932 |
| 1,922,931 | Defays et al. | Aug. 15, 1933 |
| 2,239,161 | Wemp | Apr. 22, 1941 |
| 2,491,003 | Elmore | Dec. 13, 1949 |
| 2,529,919 | Cunningham | Nov. 14, 1950 |